March 3, 1959  T. B. SHARKEY  2,875,530
OPTICAL TRAINING DEVICE TO INCREASE READING SPEED
Filed July 29, 1957
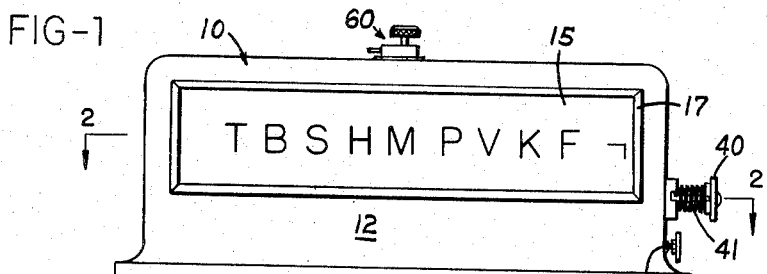
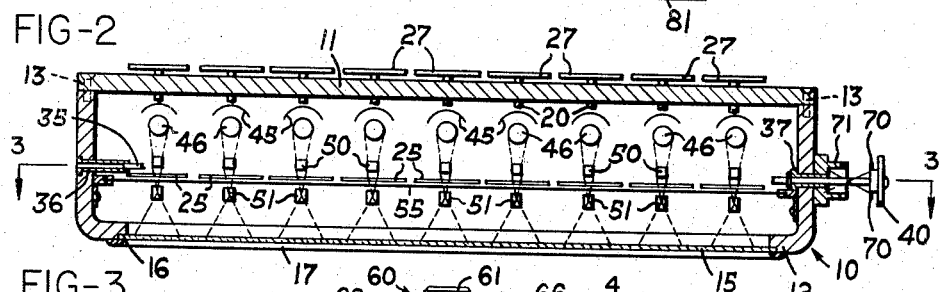
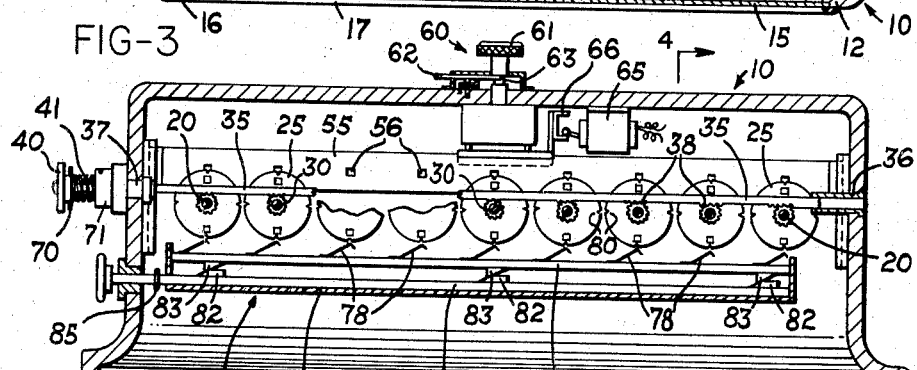
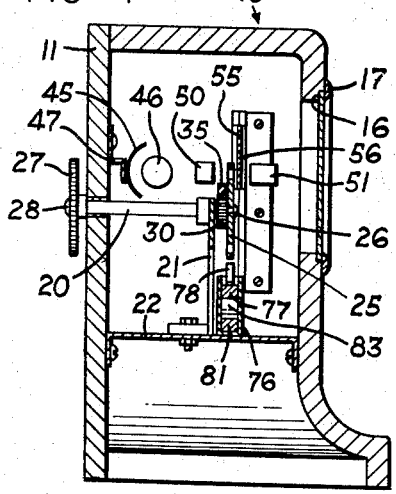
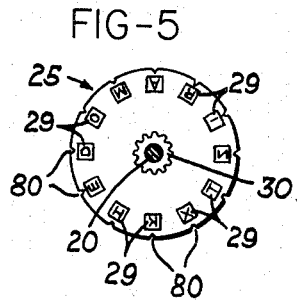
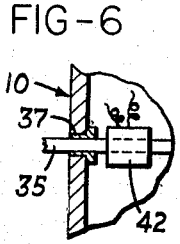
INVENTOR.
THOMAS B. SHARKEY
BY
*Marchal, Biebel, French & Bugg*
ATTORNEYS

United States Patent Office

2,875,530
Patented Mar. 3, 1959

2,875,530

OPTICAL TRAINING DEVICE TO INCREASE READING SPEED

Thomas B. Sharkey, Dayton, Ohio

Application July 29, 1957, Serial No. 674,792

6 Claims. (Cl. 35—35)

This invention relates to educational devices and more particularly to an optical training device providing for viewing of changeable character image groupings for predetermined timed intervals.

Existing optical traning devices such as timed readings devices, tachistiscopes and the like, are subject to certain disadvantages. For example, some are so complex in construction and operation that their educational value is reduced. In others the indicia or characters are fixed on slides, permitting the user or student to memorize, either consciously or unconsciously, the sequences on the various slides.

A principal object of the present invention is to provide an optical training device of simple, economical construction providing great diversity in the character image groupings or sequences produced for viewing.

Another object of this invention is to provide an optical training device having an operating mechanism for simultaneously changing all of the characters of a given grouping to present a new grouping made up of randomly selected characters.

An additional object of this invention is to provide an optical training device in which the characters making up a grouping can be individually selected upon disengagement of the mechanism which normally effects changes in all the characters simultaneously.

It is also an object of this invention to provide an optical training device in which character viewing carriers are provided for use by an operator in those cases where an operator is present.

Other objects and advantages of this invention will be apparent from the following description, the accompanying drawings and the appended claims.

In the drawings—

Fig. 1 is a front elevation of an optical training device according to the present invention showing a typical character grouping on the viewing screen;

Fig. 2 is a sectional view taken along the line 2—2 of Fig. 1 with certain parts of the device being shown schematically;

Fig. 3 is a cross sectional view taken along the line 3—3 of Fig. 2;

Fig. 4 is a sectional view taken along the line 4—4 of Fig. 3, the lighting means being shown schematically;

Fig. 5 is an enlarged axial view of a character carrier plate and the driving gear carried on its supporting shaft; and Fig. 6 is a fragmentary view of one end of the carrier operator bar showing a driving solenoid positioned thereon.

The drawing illustrates a preferred embodiment of the invention wherein the entire operating mechanism is assembled into an integral unit rather than requiring use of separated or separable components, such as is the case where characters are flashed by means of a projector upon a separate viewing screen. The present device is contained within a housing or cabinet 10 having a rear wall 11 and an apertured front wall 12, the rear wall being attached to the main body of the cabinet by means of screws 13. The front wall 12, in the apertured portion, contains a screen 15 which may be constructed of frosted glass or any other similar semi-opaque or translucent material. The screen 15 is held within a recess 16 and retained in position by means of facing strip 17.

Generally the use of the present device, as well as that of related devices, can be placed into two broad classifications; the first where it is used by only one person who operates it by himself and second where an instructor operates the device for a student. The apparatus can be used by the instructor to increase a student's vocabulary, teach foreign languages, to teach arithmetic, and other related subjects which are readily adaptable to a relatively small screen and where the instructor wishes to give individual attention to a particular student. In other situations the device will be used only by the student or viewer, for example, when it is desired to view various groups of characters for short time periods to increase reading speed and retentive ability. Although a beginning student will normally begin by using only a small number of characters, the number used, and hence the effective width of the student's perception, increases over a period of time as he is caused to view words or phrases of greater length, and the invention provides for such training.

A plurality of horizontally extending rotatable shafts 20 are supported at their outer ends by the rear wall 11 of housing 10 and at their inner ends by upstanding supports 21, which are attached to a horizontally extending base plate 22. An inner carrier plate 25 is attached adjacent the inner end of each of the shafts 20 by means of screws 26, a similar plate 27 being secured to the outer end of each of the shafts 20 by screws 28. Although the plates are here attached to the shafts by screws, any other acceptable means such as a spline connection can as readily be used. Thus the inner plates 25 and the outer plates 27 extend parallel to the wide dimension of housing 10, and the shafts 20 extend through the housing wall 11 at right angles to the planes containing the various plates.

Each inner carrier 25 contains a plurality of spaced character bearing inserts 29 which are constructed of material possessing differential light transmitting qualities in order that they may be transilluminated to cast character images on the screen 15. The body of each insert may be opaque and the character transparent or the reverse situation may be present with the character being opaque and the body of the insert transparent, the particular combination used being primarily a matter of choice. Additionally, the number of characters on each carrier may be varied as desired, and may for example include all letters of the alphabet on each carrier, and the specific showing in Fig. 5 is merely illustrative of one such arrangement. The outer carriers 27 have characters corresponding to and axially aligned with the characters borne by the inserts mounted on the first group of carrier plates 25 so that in those instances where an instructor is operating the device, he can determine the character grouping which will appear on screen 15 for viewing by the student.

Due to the fact, as previously mentioned, that students tend to memorize characters or sequences which are unchanging, it is advantageous in some situations that entirely different and unpredictable groupings be produced for viewing. The present device makes possible the obtainment of an almost infinite number of combinations by securing a gear 30 to each of the shafts for engagement with an elongated operator bar 35 extending the complete width of housing 10. The bar 35 is slidably supported within guide 36 at one end of the housing and within a bushing 37 at the other end of the housing and has rack portions 38 spaced throughout its length for engagement with the gears 30. The number of teeth on the racks may vary from gear to gear so that reciprocating movement of bar 35 will result in varying amounts of rotation of each of the shafts 20.

Bar 35 can be reciprocated manually by pushing knob 40 toward the side of cabinet 10, the rack portions then turning the shafts and becoming completely disengaged from gears 30 so that the carriers may rotate freely. Upon release of knob 40 coil spring 41 will move the operator bar 35 toward its original position, and racks 38 will reengage gears 30 to stop further rotation of carriers 25. Rotation can also be accomplished by supplying bar 35 with an electromagnetic driving motor 42 (Fig. 6) such as a solenoid, energization of the motor causing rotation of the plates 25.

The present apparatus is one in which images are cast upon a screen so that illuminating means including a plurality of mirrors 45 and corresponding bulbs or lamps 46 have been mounted within the cabinet 10 rearwardly of the position assumed by the uppermost of the carrier inserts. The mirrors are secured to the rear walls 11 by means of a small bracket 47, and the lamps mounted immediately in front of the mirrors so that the light will be reflected toward the screen 15. A condensing lens 50 and a projecting lens 51 are mounted on either side of each of the interior carriers 25 to direct the light through the uppermost insert 29 and onto screen 15.

To increase the user's or student's rate of visual perception as well as to improve his retentive ability, it has been found desirable to present images of the various characters on screen 15 for varying time intervals, for example from one second to $\frac{1}{1000}$ of a second, the rate chosen depending upon the particular person and the degree to which he has advanced through use of the apparatus. Thus through continued usage of the apparatus it is possible to decrease the time necessary to recognize and retain knowledge of the various groupings of characters, as well as to increase the number of characters comprising a given group. To achieve presentation of the characters for predetermined time intervals, a shutter 55, which moves vertically between the inner carriers 25 and the projecting lens 51, is used to control the passage of light from lamps 46 to the screen for the desired time interval. The shutter 55 contains a plurality of openings 56 corresponding in size to the openings in carriers 25 holding character inserts 29, the amount of time the given image will be seen depends upon the time required for openings 56 to traverse the uppermost character inserts 29 in the carriers 25.

The speed of travel of shutter 55 is controlled by a cocking and triggering mechanism 60 which is secured to the upper wall of cabinet 10. The mechanism operates in the same manner as the usual camera shutter and is ready for use when knob 61 is pulled outwardly from the cabinet 10 so that spring loaded trigger 62 will move into detent 63. To activate shutter 55, it is necessary only to remove trigger 62 from detent 63, at which time the shutter will move downwardly past the carriers under the influence of the usual shutter biasing means.

The lamps 46 are controlled by switch 65 which is operated by means of a U-shaped operator 66 connected to shutter 55, the lower lip of the operator 66 energizing the lamp circuit when the shutter is raised to its cocked position and the upper lip of the operator 66 deenergizing the lamp circuit after the apertures 56 have passed the upper character inserts 29. The distance between the upper and lower lips is sufficient to enable the light source to remain on until the images have been projected onto screen 15.

In those cases where an instructor is operating the device in conjunction with a student, he may desire to set the carriers 25 to particular characters. When the operator bar 35 is pushed to its innermost position, the rack portions 38 are disengaged from the gears 30, and the knob 40 is provided with opposed fingers 70 which enter into appropriate grooves within locking bolt 71 to maintain the bar 35 in this disengaged position. The fingers 70 can be engaged within the bolt merely by turning the knob 40 after it has been depressed, and after the carriers are free the operator may turn the outer carriers by hand until he obtains the particular character desired, the characters on the inner and outer carriers coinciding in position.

Since at this time the carriers are freely rotatable, additional structure is provided to insure that the carriers can be retained in their adjusted positions. This mechanism, indicated at 75, comprises a guide 76 which is attached to base plate 22, as shown in Fig. 4. The guide contains an elongated locking bar 77 having a plurality of spring-like tangs 78 which are movable into contact with positioning detents 80 formed in the outer periphery of each of the carriers 25. The bar 77 is elevated to engage the tangs 78 with positioning detents 80 by means of bar 81 which has upstanding cams 82 situated to engage similar cams 83 on the bar 77 and to cause it to ride upwardly within guide 76. The stop pin 85 extends through bar 81 to limit the outward movement of the bar so that it will not be accidentally withdrawn from the cabinet 10. Thus with the tangs 78 engaging the detents 80, the carriers 25 can be rotated in positive steps limiting the free rotation of the carriers.

Thus with the present optical training device it is possible to change all of the characters simultaneously to obtain non-repetitive groups of characters, or the characters can be individually selected to meet a particular demand. Also one or more of the inner carriers 25 can be removed, or the lamps 46 can be selectively taken out of the energizing circuit, as by means such as individual switch-controlled parallel connections in the circuit, so that the total number of images flashed on screen 15 can be controlled as desired. This provides a simple means for varying the effective length of the words and phrases being projected, and obviously this result can be further aided by increasing the overall length of the apparatus in order to accommodate additional character carriers.

While the form of apparatus herein described constitutes a preferred embodiment of this invention, it is to be understood that this invention is not limited to this precise form of apparatus and that changes may be made therein without departing from the scope of the invention which is defined in the appended claims.

What is claimed is:

1. An optical training device for viewing changeable character groupings to improve visual perception and mental retention comprising, a housing having rear and walls, a screen mounted in the front wall of said housing, a group of carrier plates extending parallel to the wide dimension of said housing, said carrier plates being mounted on separate rotatable shafts mounted at right angles to said plates, a plurality of character containing inserts having differential light transmitting properties mounted on each of said carrier plates, means for rotating all of said carrier plates simultaneously to present in random order characters on each of said carrier plates to a viewing position, changed character groupings being achieved through the random presentment of said characters following each rotation of said carrier plates, a light source supported within said housing, means conducting the light from said source through said characters following each rotation of said carrier images onto said screen following transillumination of said inserts, and means providing for viewing of each character image grouping for predetermined timed intervals.

2. An optical training device for viewing changeable character groupings to improve visual perception and mental retention comprising, a housing having a rear wall and an apertured front wall, a screen closing the aperture in the front wall of said housing, a group of carrier plates contained and extending parallel to the wide dimension of said housing, said carrier plates being mounted on separate rotatable shafts mounted at right angles to the plane containing said plates, a plurality of character containing inserts having differential light transmitting properties mounted on each of said carrier plates, a gear secured to each of said shafts between the rear wall of said housing and the rear side of said carrier plates, an operator bar extending parallel to said carrier plates and having rack portions spaced along the length thereof for engagement with said gears, said operator bar extending through one wall of said housing for reciprocating movement to effect rotation of all of said carrier plates simultaneously and present in random order a character on each of said carrier plates to the operating position, a light source positioned within said housing, lens means for transmitting light from said light source through said character inserts and projecting character images onto said screen, and shutter means providing for viewing of said character grouping for predetermined timed intervals.

3. An optical training device for viewing changeable character groupings to improve visual perception and mental retention comprising, a housing having front and rear walls, a screen mounted in the front wall of said housing, a group of carrier plates extending parallel to the wide dimension of said housing, said carrier plates being mounted on separate rotatable shafts extending at right angles to said plates, a plurality of character bearing inserts having differential light transmitting properties mounted on each of said carrier plates, a gear secured to each of said shafts between the rear walls of said housing and the rear side of said carrier plates, an operator bar extending parallel to said carrier plates and having rack portions spaced along the length thereof for engagement with said gears, said operator bar extending through one wall of said housing for reciprocating movement to effect rotation of all of said carrier plates simultaneously and present in random order a character on each of said carrier plates to the operating position, a light source mounted between the rear wall of said housing and each of said carrier plates, lens means mounted on each side of said carrier plates receiving ligh from said light source for transilluminating said inserts and projecting character images upon said screen, a shutter supported for vertical movement between said carrier plates and said screen, and means operating said shutter providing for viewing of said character images for predetermined timed intervals.

4. An optical training device for viewing changeable character groupings to improve visual perception and mental retention comprising, a housing having front and rear walls, a first group of carrier plates within said housing extending parallel to the wide dimension thereof, said carrier plates being mounted on separate rotatable shafts extending at right angles to said plates through the rear wall of said housing, a second group of carrier plates mounted on said shafts outside of said housing and adjacent the rear wall thereof, a plurality of character containing inserts having differential light transmitting properties mounted on each of said inner carrier plates, characters on each of said outer carrier plates corresponding to and axially aligned with said characters borne by said inserts, each of said carrier plates within said housing being rotatable to move selected characters to the operating position through rotation of the said corresponding carrier plate outside of said housing, illuminating means lighting said characters occupying the operating positions, and means providing for viewing of said character grouping for predetermined timed intervals.

5. An optical training device for viewing changeable character groupings to improve visual perception and mental retention comprising, a housing having front and rear walls, a first group of carrier plates within said housing extending parallel to the wide dimension thereof, said carrier plates being mounted on separate rotatable shafts extending at right angles to said plates through the rear wall of said housing, a second group of carrier plates mounted on said shafts outside of said housing and adjacent the rear wall thereof, a plurality of character containing inserts having differential light transmitting properties mounted on each of said inner carrier plates, characters on each of said outer carrier plates corresponding to and axially aligned with the characters borne by said inserts, means for rotating all of said carrier plates simultaneously to present in random order a character on each of said carrier plates to a viewing position, changed character groupings being achieved through the random presentment of said characters following each rotation of said carrier plates, illuminating means lighting said characters occupying the viewing positions, and means providing for viewing of said character grouping for predetermined timed intervals.

6. An optical training device for viewing changeable character groupings to improve visual perception and mental retention comprising, a housing having front and rear walls, a first group of carrier plates within said housing extending parallel to the wide dimension thereof, said carrier plates being mounted on separate rotatable shafts extending at right angles to said plates through the rear wall of said housing, a second group of carrier plates mounted on said shafts outside of said housing and adjacent the rear wall thereof, a plurality of character containing inserts having differential light transmitting properties mounted on each of said inner carrier plates, characters on each of said outer carrier plates corresponding to and axially aligned with said characters borne by said inserts, each of said inner carrier plates being rotatable to move selected characters to the viewing position through rotation of the said corresponding carrier plate outside of said housing, locking means engaging the outer surface of each of said inner carrier plates providing step-like rotary movement thereof to lock each character firmly in operating position, illuminating means lighting said characters occupying the operating positions, and means providing for viewing of said character grouping for predetermined timed intervals.

References Cited in the file of this patent

UNITED STATES PATENTS

| | | |
|---|---|---|
| 451,956 | Sanderson | May 12, 1891 |
| 1,992,776 | Schindler | Feb. 26, 1935 |
| 2,493,477 | De Baun | Jan. 3, 1950 |
| 2,499,323 | McCash | Feb. 28, 1950 |
| 2,647,329 | Bloch et al. | Aug. 4, 1953 |
| 2,769,260 | Fenwick | Nov. 6, 1956 |
| 2,795,058 | Kavanaugh | June 11, 1957 |

UNITED STATES PATENT OFFICE
CERTIFICATE OF CORRECTION

Patent No. 2,875,530                                        March 3, 1959

Thomas B. Sharkey

It is hereby certified that error appears in the printed specification of the above numbered patent requiring correction and that the said Letters Patent should read as corrected below.

Column 1, lines 19 and 20, for "readings devices" read -- reading devices --; column 4, line 67, for "characters following each rotation of said carrier" read -- character bearing inserts and projecting character --; column 5, line 45, for "ligh" read -- light --.

Signed and sealed this 16th day of June 1959.

(SEAL)
Attest:

KARL H. AXLINE                                                   ROBERT C. WATSON
Attesting Officer                                              Commissioner of Patents